Patented Aug. 20, 1940

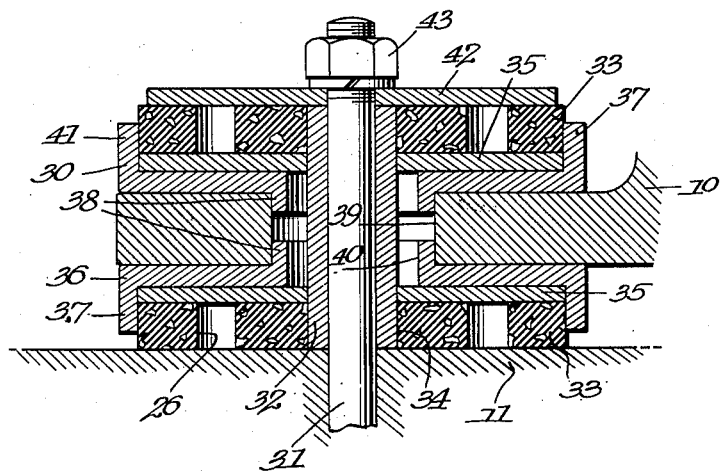
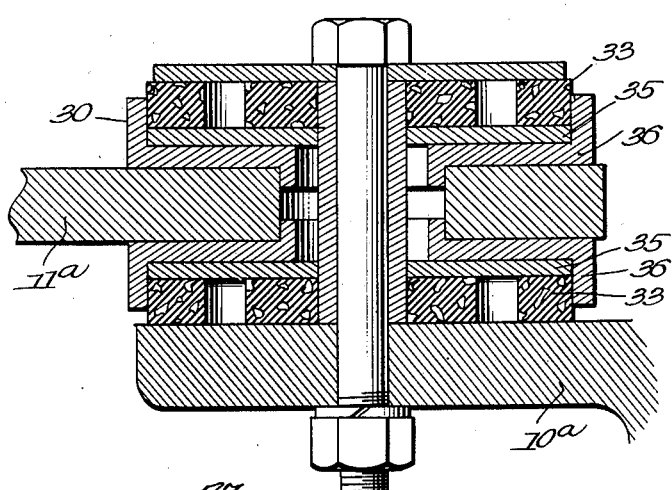

2,212,142

UNITED STATES PATENT OFFICE 2,212,142

VIBRATION ABSORBING SUPPORTING STRUCTURE

Harry M. Austin and James A. Muir, Baltimore, Md., assignors to Crown Cork & Seal Company, Inc., Baltimore, Md., a corporation of New York Application August 5, 1936, Serial No. 94,479

1 Claim. (Cl. 248—22)

The present invention relates to a vibration absorbing supporting structure and, more particularly, to a device of this type for use in supporting machinery.

The principal object of the invention is to provide a structure for supporting machinery or other relatively heavy bodies in such a manner that the apparatus will be firmly secured but the supporting structure being so designed that no vibration can be transmitted by the apparatus to the floor or foundation carrying the load.

It has heretofore been proposed to support machinery and other heavy apparatus in such a manner that its weight will be initially transmitted to an interposed resilient member. However, the resilient members ordinarily provided for this purpose have been formed of material of such nature that they are not resilient under all conditions. For example, most resilient materials are only compressible when in an unconfined position, that is, where they may expand in one direction when weight is transmitted to them from another direction. Thus, when a block of rubber is used as the resilient supporting member, and weight is transmitted to it from above, the rubber block must be free to expand laterally if it is to serve as a vibration absorption element. This results in the entire apparatus supported by the rubber being permitted to have a certain degree of lateral movement and, in large machines, the required lateral movement may be too great for practical purposes.

The structure provided by the present invention includes a resilient material which is compressible upon itself and may therefore be closely confined within a rigid structure so that its lateral movement and all lateral movement of the machines supported thereby will be entirely limited.

Other objects and advantages of the invention will be apparent from the following drawing wherein Figure 1 is a vertical sectional view of a supporting structure.

Figure 2 is a vertical sectional view of a modified structure; and

Figure 3 is a detailed sectional view showing a modified form of resilient member.

Referring to Figure 1, the numeral 10 designates a portion of the base of a machine and the numeral 11 indicates the foundation or floor, or a supporting member upon which the machine is supported by the supporting structure generally designated by the numeral 30.

The supporting structure 30 comprises a bolt 31 secured in the foundation 11 and surrounded by a sleeve 32. A resilient member or lamina 33 bears upon the supporting structure 11, the lamina being provided with a central aperture 34 which closely engages the sleeve 32. A plate 35 of stiff or rigid material, such as, metal or stiff fibre or Bakelite, rests upon the upper surface of the lamina 33, the plate and the lamina being adhesively secured to each other and being of the same outline. This construction is described in detail in our application for Vibration absorbing composition and structures embodying the same, Serial No. 80,017, filed May 15, 1936. A centering member 36 fits over the plate 35 and extends down about the lamina 33, a downwardly extending flange 37 on the centering member closely engaging the side wall of the plate and lamina, but being of such length that it will not come in contact with the foundation 11.

The base 10 of the machine bears upon the centering member 36, and a central flange 38 on the centering member extends up into an aperture 39 in the base 10, the flange 38 defining an aperture 40 in the centering member through which the bolt 31 and sleeve 32 extend, and which aperture is of sufficiently large diameter that the sleeve 32 will not contact with the centering member.

A second centering member 41 is positioned upon the side wall of the machine base 10, the centering member 41 being identical in construction with the centering member 36 but being reversed as shown in the drawing so that its central flange 38 will extend downwardly into the aperture 39 of the machine base and its outer flange 37 will extend up about a second stiff plate 35 and resilient lamina 33. A relatively large washer 42 bears on the upper surface of the upper lamina 33 and a nut 43 on a bolt 31 acts upon this washer to secure the various elements in the position shown. The sleeve 32 is of slightly less length than the total thickness of the elements beneath the washer 42 when the resilient laminae are unconstricted, so that when the nut 43 is properly tightened to bring the washer 42 in contact with the upper end of the sleeve 32, all of the elements will tightly engage as shown in the drawing.

The resilient members 33 are formed of the composition disclosed in our copending application for Vibration absorbing composition and structures embodying the same, referred to above, and may be generally described as consisting of a mass of rubber or rubber-like material having particles of cork or other bodily compressible material interspersed therethrough. As is fully described in the above mentioned application, the provision of cork particles for example, in the rubber mass permits the composition to be compressed upon itself so that it may be used in a confined space. As is well known, rubber alone is not compressible when confined, while cork, comprising substantially 50% air cells or voids by volume, may be readily compressed upon itself. The combination of the two substances permits the rubber to be deflected within the bodily confines of the elements 33 because, under compression, the mass of rubber will exert pressure upon the cork particles, compressing the latter.

As is indicated in Figures 1 and 2, the resilient members or laminae 33 may have apertures 26 spaced throughout their area, these apertures providing additional space for internal deflection of the mass of which the members are formed.

Figure 3 shows a modification of the structure described above wherein the apertures 26 in the members 33 are filled with inserts 27 of cork or other bodily compressible material, thereby increasing the resiliency of the members 33.

By the arrangements described above, all lateral movement of the machine with respect to the bolt 31 and sleeve 32 is prevented by the close engagement of the lamina 33 and stiff plates 35 with the sleeve 32 and centering members 36 but vertical movement of the machine with respect to the foundation will be possible within the limits of resiliency permitted by the laminae.

Referring to Figure 2, the numeral 10a designates the base of an inverted machine, for example, a car dynamo, supported on the underside of a car floor 11a, though it will be obvious that the numeral 10a might represent any apparatus which is suspended from a hanger or corresponding structure 11a. The numeral 30 designates the supporting structure comprising resilient laminae 33 and stiff plates 35 adhesively secured to the laminae, together with the centering member 36. It will be observed that the supporting structure shown in Figure 2 is identical with that shown in Figure 1, except that the position of the machine base 10 and the foundation 11 are respectively reversed.

The action of the rubber and cork lamina 33 in the Figure 2 structure will obviously be the same as in the Figure 1 structure and, if desired, the Figure 3 modification may be used with the Figure 2 structure.

We claim:

A supporting mounting comprising a central stud means, enclosing means, one of said means being fixed to a supporting structure and the other being fixed to a supported structure, said enclosing means comprising two flanged elements respectively positioned on opposite faces of the structure to which said enclosing means is secured, and each of said flanged elements including an inner flange seated in an aperture in such structure, each of said flanged elements having an outer flange, said central stud means extending through the inner flanges of said flanged elements and being spaced therefrom, a plate rigidly secured to the outer end of said central stud, a rigid apertured disc in each of said flanged elements, the periphery of said disc engaging the inner surface of the outer flange of the corresponding flanged element, and the aperture of said disc closely embracing said central stud means, a resilient member between the flanged element which is adjacent the structure to which said central stud means is secured and said latter structure, and a resilient member between the other flanged element and the plate secured to the outer end of said central stud member, each of said resilient members being provided with a central aperture and having the edge of its aperture in contact with said central stud means and its periphery in contact with the flanged element in which it is seated.

HARRY M. AUSTIN.
JAMES A. MUIR.